US007529990B2

(12) United States Patent
Haggerty

(10) Patent No.: US 7,529,990 B2
(45) Date of Patent: May 5, 2009

(54) SYSTEMS AND METHODS FOR MANAGING MULTI-DEVICE TEST SESSIONS

(75) Inventor: David Haggerty, Apple Valley, MN (US)

(73) Assignee: BSquare Corporation, Bellevue, WA (US)

(*) Notice: Subject to any disclaimer, the term of this patent is extended or adjusted under 35 U.S.C. 154(b) by 202 days.

(21) Appl. No.: 11/421,476

(22) Filed: May 31, 2006

(65) Prior Publication Data

US 2006/0271327 A1 Nov. 30, 2006

Related U.S. Application Data

(60) Provisional application No. 60/685,958, filed on May 31, 2005.

(51) Int. Cl.
*G01R 31/28* (2006.01)
(52) U.S. Cl. .................. 714/724; 714/38

(58) Field of Classification Search ............. 702/118; 715/771; 324/765; 714/724, 721, 38
See application file for complete search history.

(56) References Cited

U.S. PATENT DOCUMENTS

| 5,390,129 | A  | * | 2/1995 | Rhodes ............... 702/118 |
| 6,624,830 | B1 | * | 9/2003 | Beck et al. ........... 715/771 |
| 7,378,864 | B2 | * | 5/2008 | Chung et al. ......... 324/765 |

* cited by examiner

*Primary Examiner*—David Ton
(74) *Attorney, Agent, or Firm*—Townsend and Townsend and Crew LLP

(57) ABSTRACT

Systems and methods for a design and runtime environment manage a set of devices under test. The devices under test may include devices that are similar to one another or devices that are different from one another. Particular devices may be selected based on matching device properties to desired device parameters.

19 Claims, 11 Drawing Sheets

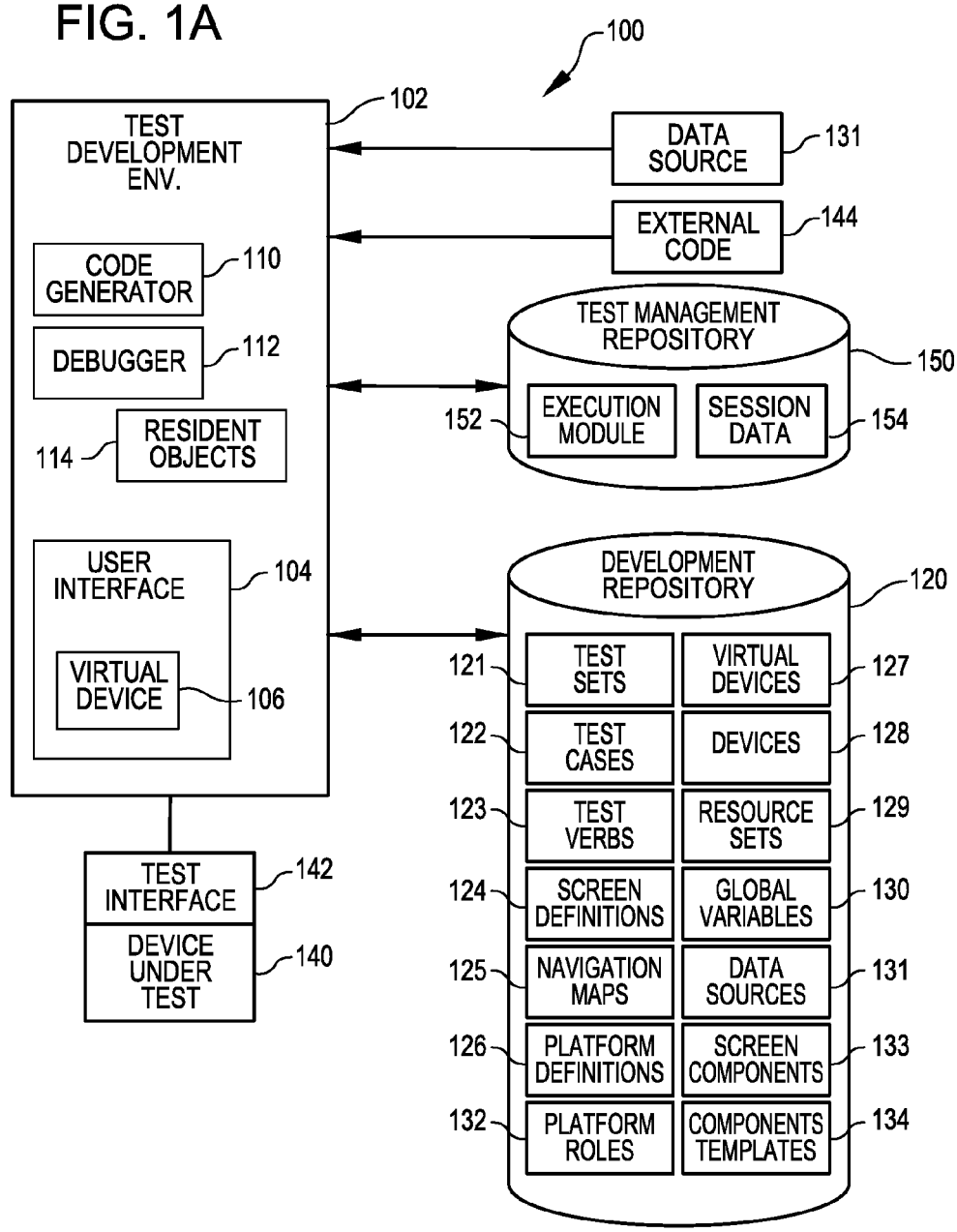

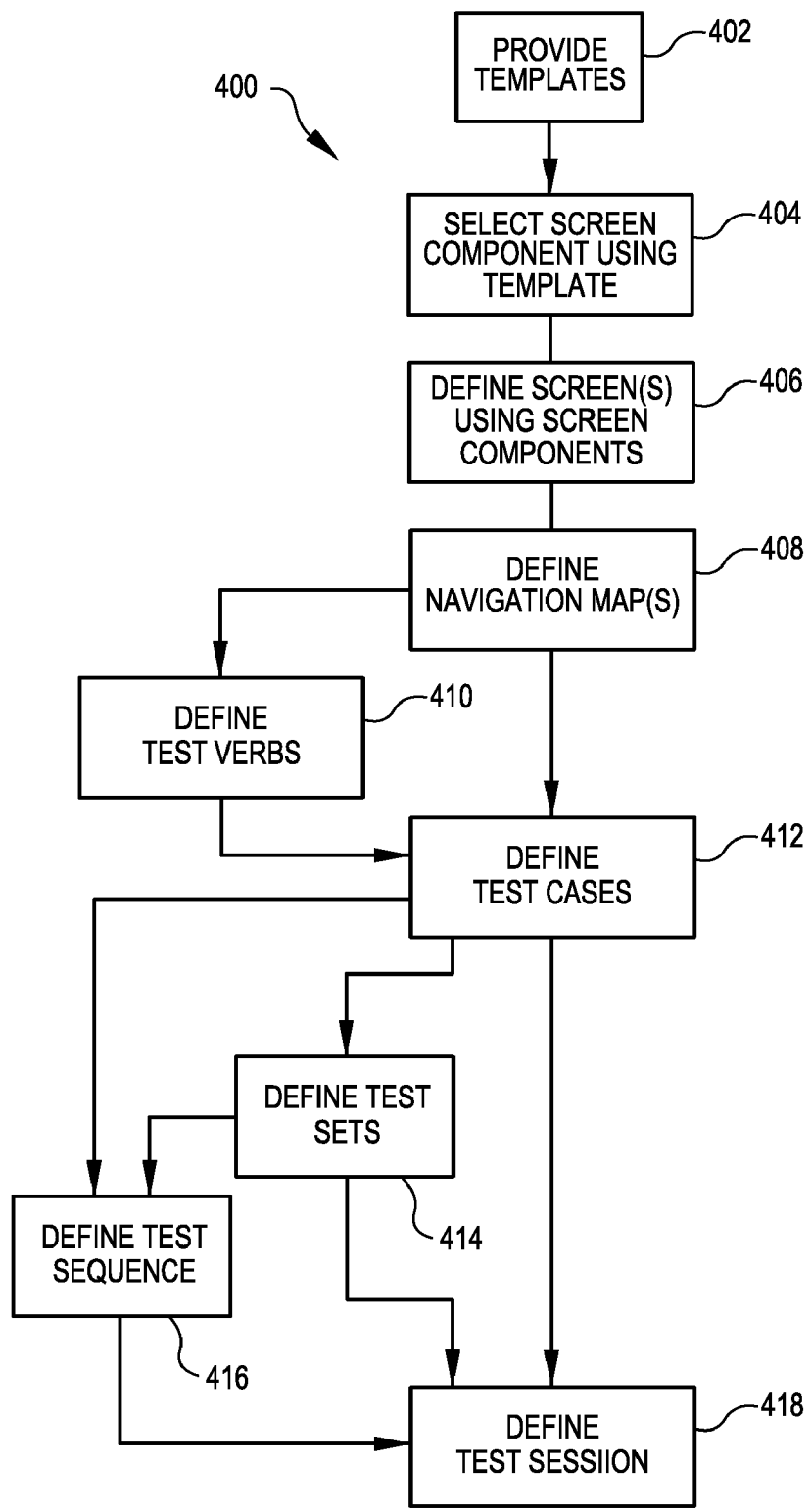

SYSTEMS AND METHODS FOR MANAGING MULTI-DEVICE TEST SESSIONS

RELATED APPLICATIONS

This application claims the priority benefit of U.S. Provisional Application Ser. No. 60/685,958 filed May 31, 2005, the contents of which are incorporated herein by reference in their entirety.

This application is related to application Ser. No. 11/421,453, filed even date herewith, entitled "SYSTEMS AND METHODS PROVIDING A NORMALIZED GUI FOR TESTING DISPARATE DEVICES", application Ser. No. 11/421,407, filed even date herewith, entitled "SYSTEMS AND METHODS PROVIDING A DECLARATIVE SCREEN MODEL FOR AUTOMATED TESTING", application Ser. No. 11/421,464, filed even date herewith, entitled "SYSTEMS AND METHODS FOR GRAPHICALLY DEFINING AUTOMATED TEST PROCEDURES", and application Ser. No. 11/421,468, filed even date herewith, entitled "SYSTEMS AND METHODS PROVIDING REUSABLE TEST LOGIC", all of the above of which are hereby incorporated by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, TestQuest, Inc.

BACKGROUND

An information-processing system is tested several times over the course of its life cycle, starting with its initial design and being repeated every time the product is modified. Typical information-processing systems include personal and laptop computers, personal data assistants (PDAs), cellular phones, medical devices washing machines, wristwatches, pagers, and automobile information displays.

Many of these information-processing systems operate with minimal amounts of memory, storage, and processing capability. Because products today commonly go through a sizable number of revisions and because testing typically becomes more sophisticated over time, this task becomes a larger and larger proposition. Additionally, the testing of such information-processing systems is becoming more complex and time consuming because an information-processing system may run on several different platforms with different configurations, and in different languages. Because of this, the testing requirements in todays information-processing system development environment continue to grow.

For some organizations, testing is conducted by a test engineer who identifies defects by manually running the product through a defined series of steps and observing the result after each step. Because the series of steps is intended to both thoroughly exercise product functions as well as re-execute scenarios that have identified problems in the past, the testing process can be rather lengthy and time consuming. Add on the multiplicity of tests that must be executed due to system size, platform and configuration requirements, and language requirements, and one will see that testing has become a time consuming and extremely expensive process.

In today's economy, manufacturers of technology solutions are facing new competitive pressures that are forcing them to change the way they bring products to market. Being first-to-market with the latest technology is more important than ever before. But customers require that defects be uncovered and corrected before new products get to market. Additionally, there is pressure to improve profitability by cutting costs anywhere possible.

Product testing has become the focal point where these conflicting demands collide. Manual testing procedures, long viewed as the only way to uncover product defects, effectively delay delivery of new products to the market, and the expense involved puts tremendous pressure on profitability margins. Additionally, by their nature, manual testing procedures often fail to uncover all defects.

Automated testing of information-processing system products has begun replacing manual testing procedures. The benefits of test automation include reduced test personnel costs, better test coverage, and quicker time to market. However, an effective automated testing product can be costly and time consuming to implement. The software methods, interfaces and procedures required to thoroughly test an information processing system can be nearly as complicated as the information processing system itself. For example, many information processing systems provide user interfaces that require navigation through a series of screens, with each screen potentially requiring input data. In previous systems, each test method required the test developer to provide code to navigate to the desired screen. If the interface changes in subsequent versions of the information processing system, the test procedure also typically must be modified to reflect the change. Such changes can be costly and time consuming to implement.

It is common for independent software developers to write software programs that must operate on a diverse set of computing devices. An example of this is software developed for mobile phones. Mobile phones are very heterogeneous with different operating systems, form factors, input mechanisms, screen sizes and color, and GUI styles. This causes applications to look different and to some extent operate differently on each mobile platform, even though the basic function of the software is preserved.

In most software development companies the technicians and engineers responsible for the testing software applications are not software engineers. This is because testing technicians and engineers have historically worked in organizations where manual testing methods have been the principal method of test. Consequently, the level of software engineering skill in a software testing organization is typical low.

In view of the above problems and issues, there is a need in the art for the present invention.

SUMMARY

Some embodiments of the invention provide a runtime environment providing canonical definition for commonly found GUI components and other man machine interfaces (physical buttons, audio input/output, touch screen etc.)

Some embodiments of the invention provide a run-time environment providing navigation maps using declarative model defined at design-time by recording actual manipulation of a physical device through a virtual device interface. The navigation maps may be used to automatically navigate to application screens eliminating need for test engineer to provide navigation code.

Some embodiments provide a GUI to represent and define test elements. Defining and recording test steps in graphical form as opposed to textual form in test code.

Some embodiments provide the ability to define an automated test procedure using test verbs, navigation maps, and other components that can run on a variety of different test targets.

Some embodiments provide a concurrent test interface for testing multiple disparate devices and operating systems for distributed computing environments.

Additionally, some embodiments provide the ability to aggregate and manage one or more remote test devices as a pool of test devices or test systems.

BRIEF DESCRIPTION OF THE DRAWINGS

FIG. 1A is a block diagram illustrating a system incorporating embodiments of the invention.

FIG. 4 provides a flow illustrating a test design process according to embodiments of the invention.

DETAILED DESCRIPTION

Figure 1B:
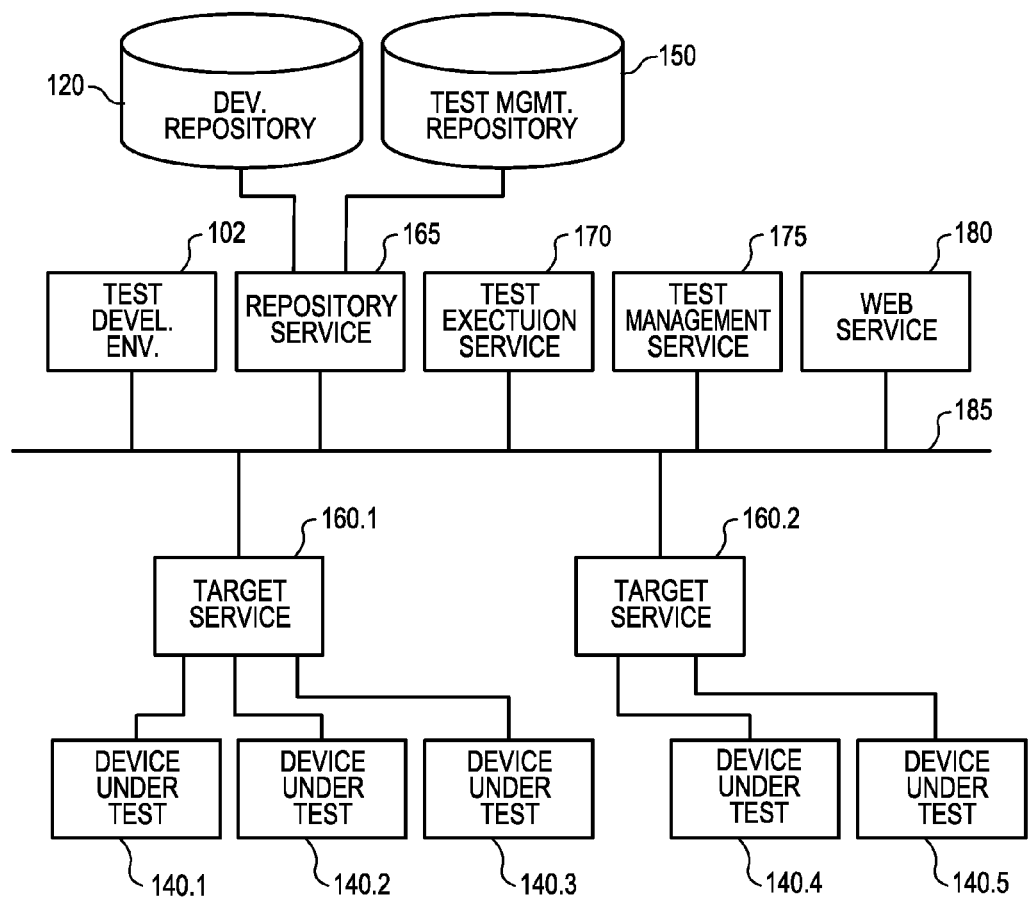
FIG. 1B is a block diagram providing further details of a system incorporating embodiments of the invention.

In the following detailed description, reference is made to the accompanying drawings that form a part hereof, and in which is shown by way of illustration, specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims of the invention.

In the Figures, the same reference number is used throughout to refer to an identical component which appears in multiple Figures. Signals and connections may be referred to by the same reference number or label, and the actual meaning will be clear from its use in the context of the description.

The functions or algorithms described herein are implemented in hardware, and/or software in embodiments. The software comprises computer executable instructions stored on computer readable media such as memory or other types of storage devices. The term "computer readable media" is also used to represent software-transmitted carrier waves. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server, a router, or any other device capable of processing data including network interconnection devices executes the software.

Some embodiments implement functions in two or more specific interconnected hardware modules or devices with related control and data signals communicated between and through the modules, or as portions of an application-specific integrated circuit. Thus, the example process flow is applicable to software, firmware, and hardware implementations.

In the discussion below, the terms "design time" and "run time" may be used to describe aspects of the operation of various embodiments. In general, the term "design time" refers to activities and/or operations that take place during the design of a particular test case or test set. In general, the term "run time" refers to activities and/or operations that take place during the execution of a test case or a test set of test cases.

System Overview

As noted above, it is common for independent software developers to write software programs that must operate on a diverse set of heterogeneous computing devices where applications to look different and to some extent operate differently on each mobile platform, even though the basic function of the software is preserved. In these types of software development environments it is essential for an automated test system to facilitate and maximize the reuse of test logic. Without a systematic and automated approach for managing the complexity of test logic reuse, automated software testing is not economically viable.

Further, as noted above, in most software development companies the technicians and engineers responsible for the testing software applications are not software engineers. Given this situation, it is desirable that a productive and viable tool for automated testing be simple to understand, intuitive in its operation, and hide and manage as much complexity as possible.

FIG. 1A is a block diagram illustrating a system 100 incorporating embodiments of the invention. In some embodiments, system 100 includes a test development environment 102, development repository 120, test management repository 130 and a device under test (DUT) 140.

DUT 140 may be any type of device incorporating processing logic. Such devices include but are not limited to personal digital assistants (PDAs), cellular telephones, mobile computing devices, laptop computers, handheld computers, personal computers, server computers, mainframe computers, workstation computers and combinations of the above. DUT 140 may include one or more systems under test, including applications that may be tested using embodiments of the invention.

Test interface 142 provides an interface between the DUT 140 and the test development environment 102. The test interface communicates commands and stimulus from the test development environment 102 to the DUT 140 and communicates the DUT's response to the commands and stimulus back to the test development environment 102. In some embodiments, the test interface is a minimally invasive software test agent that resides on the DUT. In general, the minimally invasive software test agent provides stimulus to the device and provides a bitmap comprising a screen on the device displayed in response to the stimulus. Further details on such a minimally invasive software test agent may be found in U.S. patent application Ser. No. 10/322,824 entitled "Software Test Agents" which is hereby incorporate by reference herein for all purposes.

In alternative embodiments, test interface 142 may be a more invasive test interface that examines the user interface code and data structures resident on a DUT and uses the current state of the code and data to determine how to stimulate the DUT and how to interpret responses from the DUT.

The DUT may be a physical device that is communicably coupled to the test system either directly or through a network path. Alternatively, the DUT may be an emulated device in which the characteristics of a physical device are emulated by software operating on a computing system that is communicably coupled to the test system either directly or though a network path.

Development repository 120 comprises a database of various objects that may be created, read, updated and/or deleted using the test development environment 102. In some embodiments, development repository 120 may be a relational database such as the Microsoft SQL Server database. In alternative embodiments, repository 120 may be a set of files on a file system, an object oriented database, a hierarchical database, or an XML database. Development repository 120 may contain a variety of objects, include one or more of test sets 121, automated test cases 122, test verbs 123, screen definitions 124, navigation maps 125, platform data 126, resource sets 127, virtual device definitions 128, device data 129, global variables 130, data sources 131, platform roles 132 and templates 133. Various embodiments will maintain varying combinations of the above-named components, and no embodiment need necessarily contain all of the above-named components.

Test sets 121 comprise sets of one or more automated test cases 122 along with other logic to control the execution or invocation of the automated test cases 122. In some embodiments of the invention, a test set references test cases only, and does not reference other types of objects in the repository 120. Test sets provide a convenient way to manage groups of test cases that may be applicable for a particular type of DUT, or groups of DUTs.

Automated test case 122 comprises logic and data that provides a discrete test unit for a DUT, or group of DUTs. An automated test case 122 is a series of one or more test steps and may utilize or reference one or more test verbs 123, screen definitions 124 and external code 150. The steps in an automated test case may be defined using a test case editor as described below.

Test verbs 123 define logic and actions that may be performed on the DUT or group of DUTs. Further details on test verbs may be found in U.S. patent application Ser. No. 10/323,095 entitled "Method and Apparatus for Making and Using Test Verbs" and in U.S. patent application Ser. No. 10/323,595 entitled "Method and Apparatus for Making and Using Wireless Test Verbs", each of which are hereby incorporated by reference herein for all purposes.

Screen definitions 124 comprises data that may be used to define one or more screens displayed by software executing on the DUT. For example, the screen definitions may comprise application screens for email applications, contact manager applications, calendar applications etc. that execute on a PDA. The data for a screen definition may include a bitmap of all or a portion of the screen, and references to screen components 133. In some embodiments, a screen may be identified by presence of a screen component 133 which is a unique identifier for a particular screen.

Screen components 133 define buttons, menus, dialog boxes, icons, and other user interface elements that may appear on a screen.

A navigation map 125 defines screen transitions describing the device interactions that may be provided to cause the DUT to move from screen to screen. A navigation map may include the commands needed to move from one screen to another, or from one screen to many other screens and vice versa. Further details on navigation maps are described below.

Platform data 126 comprises data that defines properties for abstractions related to platforms, including platform types, platform groups, and platform definitions. For example a platform type definition describes properties of a platform that are independent of, or generic to, devices that execute the platform system. Examples of various platform types include Windows Operating System (OS) platforms, Symbian OS platforms, PocketPC OS platforms, and SmartPhone OS platforms. A platform group describes properties of a platform within a platform type that are generic to groups of operating systems within the type. For example, a PocketPC OS platform type may include a group defining properties for a Pocket PC 2003 operating system and a group defining properties for a Pocket PC 2003 SE operating system. A platform definition describes the properties of a platform within a platform group that are generic to one or more devices within the platform group. For example, the PocketPC 2003 operating system group may include a platform definition that defines the properties of one or more devices utilizing the PocketPC 2003 operating system. Those of skill in the art will appreciate that various platforms types, groups, and definitions now exist and may be developed in the future, and that such platforms are within the scope of the inventive subject matter. Further, the boundaries and data that define a type or group may vary in various embodiments. In some embodiments, the data provided as part of a platform group definition may include one or more of platform name, platform OS, platform GUI (Graphical User Interface) style, platform language, platform screen resolution, platform screen color depth and other device attributes needed to characterize devices. Identification of the type of virtual device to be used to represent the platform may be also specified.

Virtual Device 127 comprises data that defines properties of an abstraction of a type of device. For example, a virtual device may comprise an iPaq type device, or a Treo type device. The virtual device data in some embodiments includes data that is common or generic to all of the devices of a particular platform definition. In some embodiments, the data defining a virtual device may include one or more of a device skin, keyboard area, hotspots (including possible button states), keyboard properties, touch screen properties, glyph drawing properties, and screen capture parameters such as the screen capture poll rate.

Device 128 comprises data that defines the properties of a particular DUT. In some embodiments, these properties include a device name, a device OS version, a device GUI style, a device language, a device screen resolution, a device screen color depth, and one or more virtual devices that may be associated with the device 128. In addition, device properties may include connection related properties such as a host name identifying a host in a network where the device is connected, a connection type (e.g. serial, USB, network etc.), a device connection address, and other connection related properties such as message timeout values and command response timeout values. As noted above, the DUT may be a physical device or an emulated device.

Resource sets 129 comprise data that may be used by the screen components described above. For example, in some embodiment text strings may be defined in various languages. A resource set for the text strings for a particular language may be used by the above-described components to provide language independence or to customize the system for a particular language.

Global variables 130 comprise data that may be used within each logical unit of a test set or test case.

Data sources 131 comprises data that may be used as a source to provide input data for a test case or test set. For example, assume that a test case requires the input of multiple contact names and addresses. A data source 131 may be used to provide the data for the names and addresses. A data source 131 may be a table or tables in an external RDBMs, or it may be an external file such as a text file, or a spreadsheet file.

Platform roles 132 represent unique instances of a platform definition. Platform roles may have several functions. In some embodiments, they make it possible to invoke more than one instance of a platform type at one time. Additionally, they may make it possible to identify which platform definitions are the same device and which are different devices across one or more test sets, test cases and test verbs. Further, they may provide an indication of the test role of a particular platform definition or device in a test. In some embodiments, a DUT may be assigned roles comprising "primary" and "secondary". In alternative embodiments, the user may declare the platform roles. In these embodiments there may be an arbitrary number of roles, and roles may be arbitrarily labeled providing a user a great deal of flexibility in defining automated tests.

Component Templates 134 comprise standard (or canonical) definitions for various user interface elements for a platform type, groups, and definition; such as menus, icons, buttons, text fields etc. The standard definitions may be used as a basis for defining specialized instances of the user interface elements for a particular platform within a platform type, group, or definition. In addition to setting the properties for a screen component 133 instance, component templates automate the process of identifying the component instance on the screen. As an example, the component template is dragged onto the screen and the component is automatically recognized by the template.

Test development environment 102 is a set of one or more software applications that provide a user interface for managing the components in repository 120 and for designing and managing automated test cases. In some embodiments, test development environment 102 includes a user interface 104, a code generator 110, and a debugger 112. In operation, the test development environment 102 reads one or more objects from the repository 120 that become resident objects 114. Resident objects 114 may be created, read, updated or deleted using user interface 104. Resident objects may be saved back to the repository 120. In some embodiments, user interface 114 is a graphical use interface that may be used to manipulate objects in repository 120. Further details on a user interface according to embodiments of the invention are provided below with reference to FIGS. 3-6.

In some embodiments, a virtual device interface 106 is part of user interface 104. Virtual device interface 106 provides a representation of a DUT (i.e. a skin) that may be used to provide a graphical image of a DUT. The virtual device may have hot spots that correspond to buttons on the DUT, and may also emulate other aspects of the user interface of a DUT. The virtual device 106 may thus be used to provide stimulus that is related to the DUT through the test interface 142. Responses, from the DUT to the stimulus may then be provided through the test interface 142 and any screen changes may be shown on the virtual device. The response may include an updated screen bitmap that reflects changes on a screen of the DUT. Virtual devices provide a mechanism to develop tests on devices located at remote locations, and designed to provide an interface that may be more convenient or easy to use than the actual device.

Debugger 112 provides an interface to debug automated test cases 122. In some embodiments, debugger 112 provides an interface that allows breakpoints to be set at certain points in the execution of a test case. In addition, in debugger 112 may provide the ability to single step through one or more steps in a test case, including stepping into or stepping over a sub-component of a test case (e.g. a test verb). Additionally, debugger 112 may provide an interface allowing a user to watch for changes in the local, interface, and global variables used by a test case.

Code generator 110 operates to generate executable code for a test case. In some embodiments, a user utilizes user interface 104 to develop and debug a test case 122. In some embodiments, the code generator automatically and transparently generates and compiles test logic code, for example when the test code is ready to be executed or debugged. The code generator reads the test case logic and data (including navigation maps, screen definitions, test verbs, and calls to external code) and generates and compiles executable code that performs the logic of the test case. In some embodiments, code is generated in the C# programming language and is targeted for a Microsoft .net framework.

Test management repository 130 may be used in some embodiments to store previously generated test that are deployed or otherwise readied for operational use. In some embodiments, the execution module or modules 132 are generated and compiled by code generator 110 and linked into a framework. In addition, test management repository 150 may manage test session data 154. Session data 154 tracks which DUTs are in use, and which are available for testing.

FIG. 1B is a block diagram providing further details of a system incorporating embodiments of the invention. In some embodiments, the system includes test development environment 102, repository service 165, test execution service 170, test management service 175, web service 180, and target service 160, which in some embodiments may be communicably coupled via a network 185. Network 185 may be a corporate LAN, intranet, WAN or other network. Additionally, network 185 may include the Internet. It should be noted that some or all of the services shown in FIG. 1B may be included on a single system, in which case a network may not be required in order for such collocated services to communicate.

Repository service 165 is a repository manager that manages development repository 12 and test management repository 150. In some embodiments, repository server 165 may include a database management service such as Microsoft SQL server. Repository service 165 provides interfaces for other service to create, read, update and delete data in the repositories.

As noted above, test development environment 102 may be used to design and test a test application.

Web service 180 provides a web based interface to a browser to allow users to control test execution for tests that have been deployed. Test may be invoked immediately, or may be scheduled for future execution using a browser in communication with web service 180.

Test management service 175 controls test scheduling. This may include time of day, day of week scheduling, and may also include scheduling test at matching devices and platforms become available. When a test is scheduled to run, test management service 175 sends a test execution command to test execution service 170.

Test execution service 170 receives commands to execute one or more tests. Test execution server selects an appropriate target service based on test parameters, including searching for a matching test platform, and causes a test to be executed on a device under test 140 that includes a matching platform.

Figure 1C:
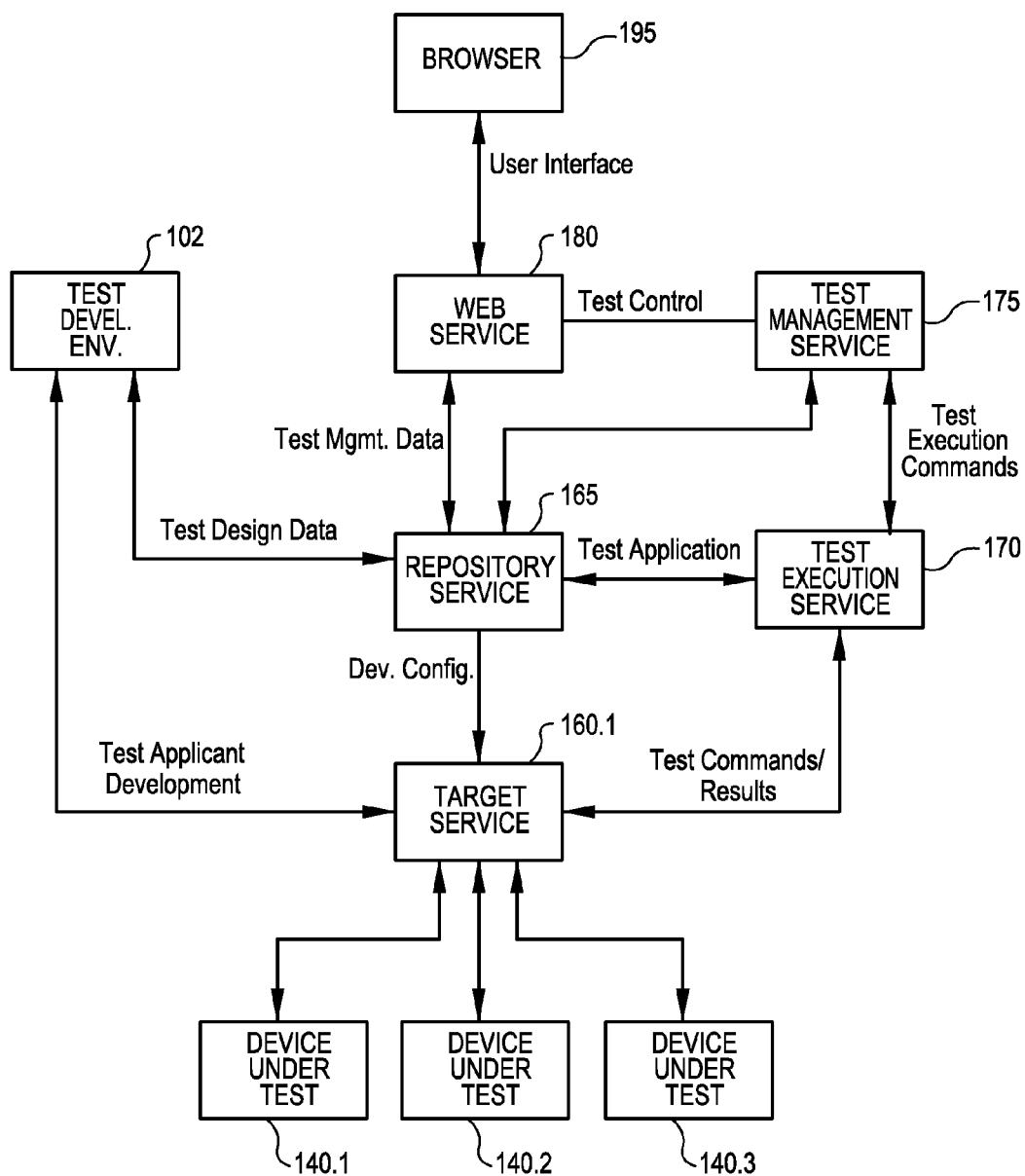
FIG. 1C is a block diagram showing the logical relationship of various components in a system according to embodiments of the invention.

FIG. 1C is a block diagram showing the logical relationship of the various components described above in a system according to embodiments of the invention.

Figure 2:
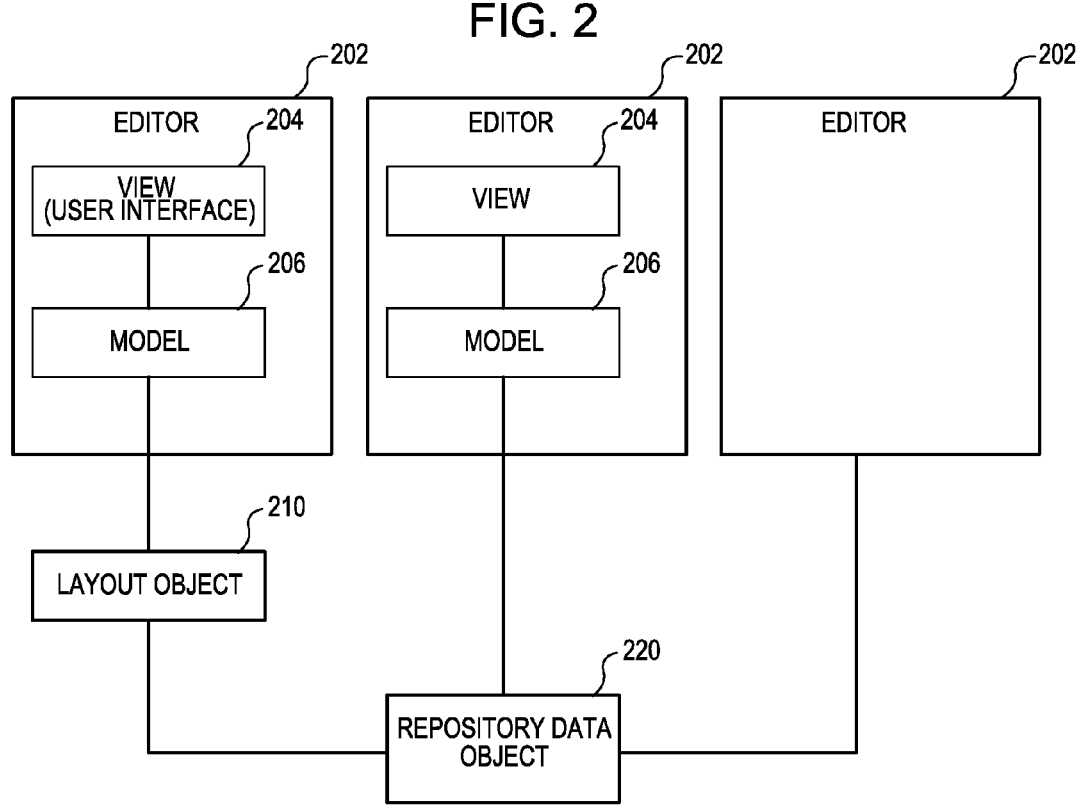
FIG. 2 is a block diagram illustrating object management components according to embodiments of the invention.

FIG. 2 is a block diagram illustrating object management components according to embodiments of the invention. In some embodiments the object management components include editor 202, layout object 210 and data objects 220. data objects 220 include repository objects 121-131 above, such as automated test cases 122, test verbs 123, navigation maps 125, and screen definitions 124 (including screen component and component type definition).

Editor 202 comprises any user interface component that may be used to visualizes or change the properties a data object 220. Editor 202 may include a view 204 and/or a model 206. Model 206 is a data object that defines the business logic of editor 202. View 204 is a visual representation of editor 202 that is presented to the user.

Layout object 210 comprises a stored description of how the data object 220 is shown in the given editor 202. Not every editor needs a layout object 210.

Figure 3:
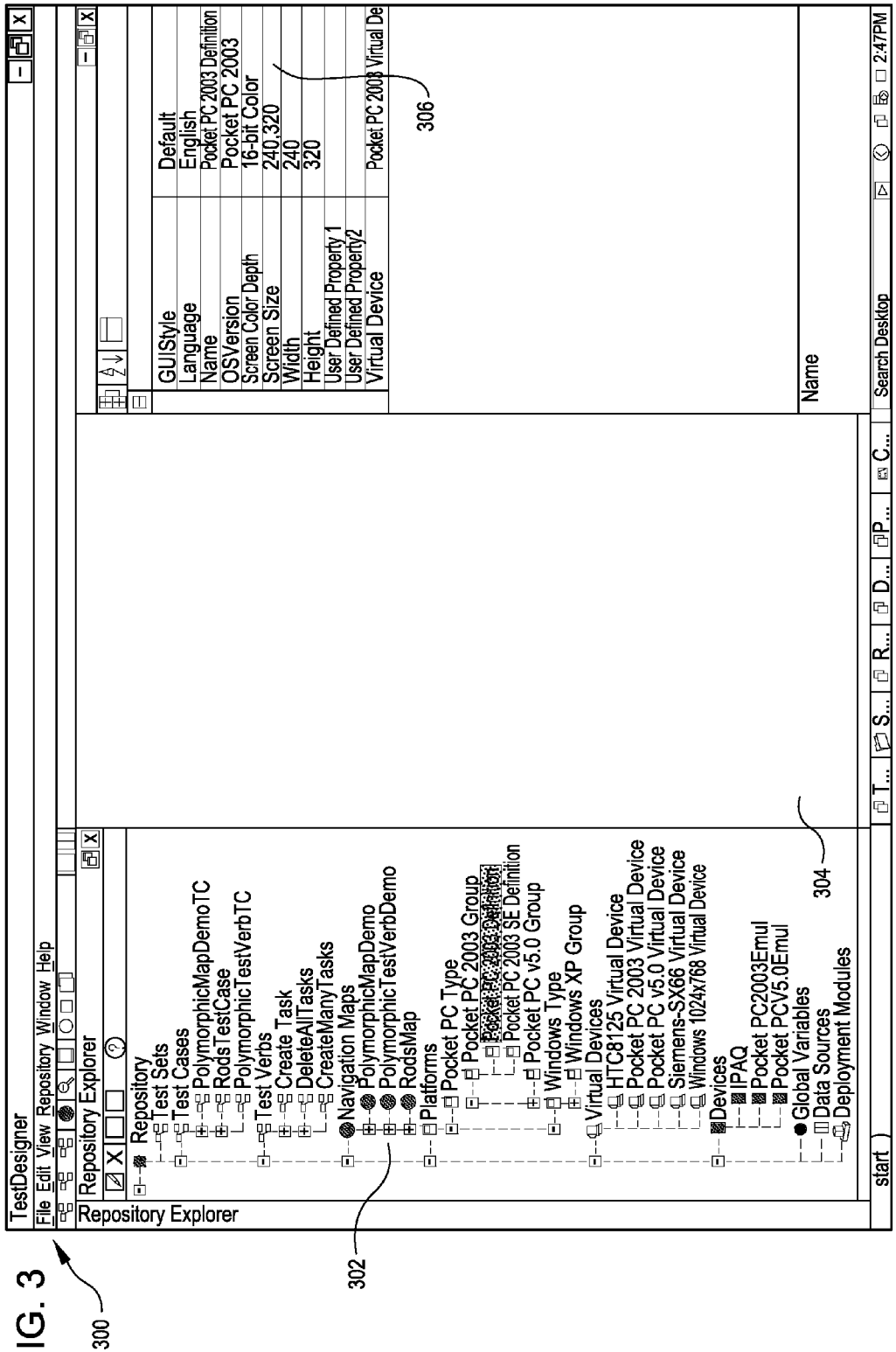
FIG. 3 illustrates an example main screen of a test development environment according to embodiments of the invention.

FIG. 3 illustrates an example main screen 300 of a test development environment 102 according to embodiments of the invention. In some embodiments, screen 300 includes one or more of an explorer pane 302, a properties pane 306 and a detail pane 304. Explorer pane 302 in some embodiments provides a list of categories and objects that may exist in a repository, and provides an interface to select categories and items for editing. In the example shown, explorer pane 302 includes user interface elements for test sets, test cases, test verbs, navigation maps, global variables, data sources, resource tables, custom code, and deployment modules. Selection of a user interface element will typically cause the explorer pane to show expanded or further details or a listing of particular data objects that may be selected for view, execution and/or editing. In the example shown, a Pocket PC 2003 platform definition have been selected. As a result of the selection, property pane 306 has been displayed to show property values for various properties of the platform definition.

Properties pane 306 in some embodiments displays a list of properties associated with a selected item. The properties may be selected, and values associated with the properties may be changed. Any manner of editing a property value may be used, including direct text entry, selection from a drop-down box, selection from a check box, or other user interface editing device known in the art.

Detail pane 304 is typically used to provide a graphical representation of an interface element selected from explorer pane 302. Further details on such graphical representations are illustrated below with reference to FIGS. 5-6.

FIG. 4 illustrates an example flow diagram for test design. A typical design flow 400 starts at 402 by providing templates for components used in defining a screen. The example flow 400 for a test design is a bottom-up design flow and is not the only flow possible. Top-down flows and inside-out flows are possible and productive as well. An example of a top-down flow would be to define a test case first followed by navigation maps and test verbs. The purpose of templates is to automate the process of creating screen components. The templates may provide standard property values and/or bitmap definitions for various user interface elements of a device under test. In some embodiments, the templates may include buttons, boxes, menus, icons, tables, text fields, track bars, and keyboard elements.

Next, at 404, a component instance is created. The component instance may be created from a template provided at 402 by dragging the template over or near the relevant portion of a screen image as will be further described below. In some embodiments components are automatically recognized without user action when the screen is added to the navigation map. In general, instances of components are related to the template used to create the component instance. This is desirable, because a change in the template may be automatically propagated to all of the component instances that refer to the template. Templates may significantly reduce the user workload when creating components by automatically recognizing the component on the screen, and by automatically setting all the properties of the component.

At block 406, a screen is defined using components defined at block 404. In some embodiments, a screen is defined using one or more components, some or all of which must be present in order for the screen to be recognized and operate properly. A user interface for defining a screen according to embodiments of the invention is described below.

At bock 408, a navigation map is defined using one or more screens. In general, a navigation map comprises a set of one or more screens as defined at block 406, together with commands and data that define the transitions from one screen to another. A user interface for creating and maintaining a navigation map is provided below.

At block 410, a test verb may be defined using test logic and the navigation maps defined at block 408. Similarly, at block 412 a test case may be defined using test logic the navigation maps defined at block 408. The test logic for a test case may invoke a test verb. An interface screen for defining test logic and using navigation maps is described below.

At block 414, a test set may be defines using one or more test cases. Similarly, at block 416 test sequence may be defined using one or more test cases, one or more test sets, or a combination of test cases and test sets. A test sequence may include an order of execution for the test cases and test sets in the test sequence.

At block 418, a test session is defined. A test session defines the global variables, and other test parameters for a particular execution of a test sequence, test set, or test case.

Figure 5A:
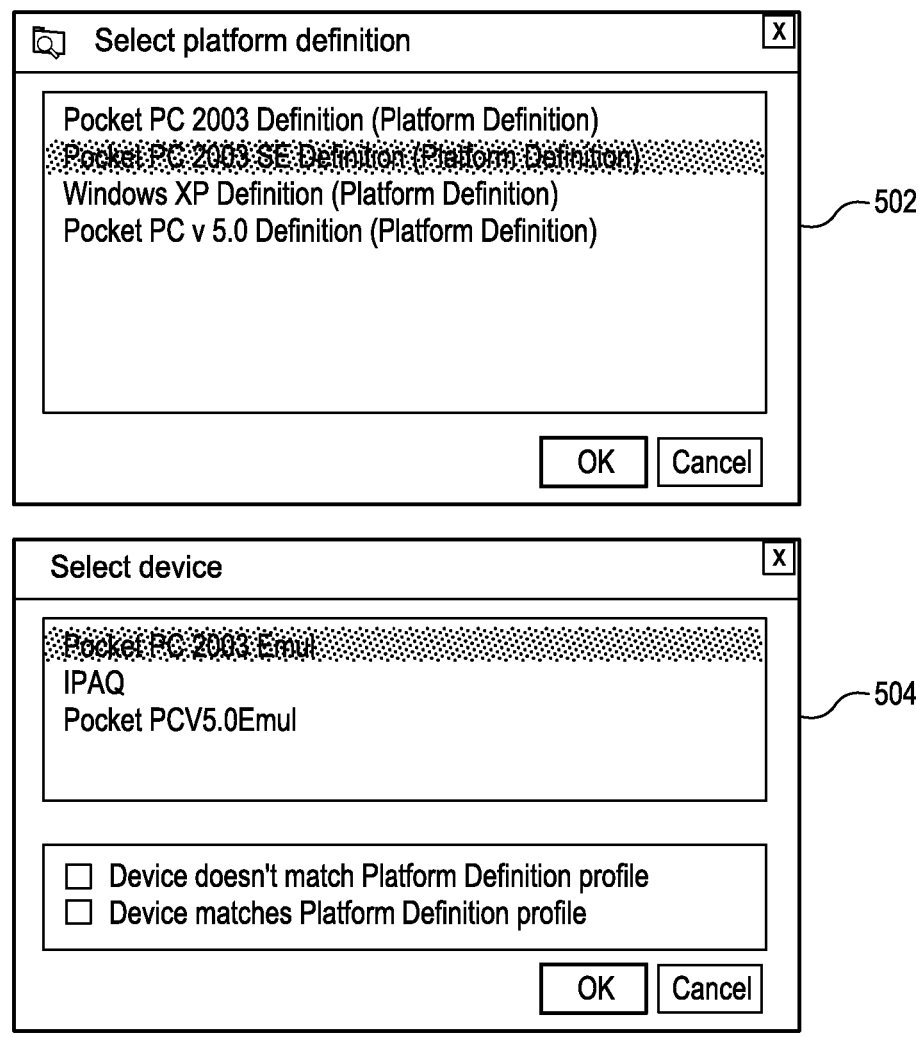
FIGS. 5A-5D illustrate example navigation map panels of a test development environment according to embodiments of the invention.
Figure 5B:
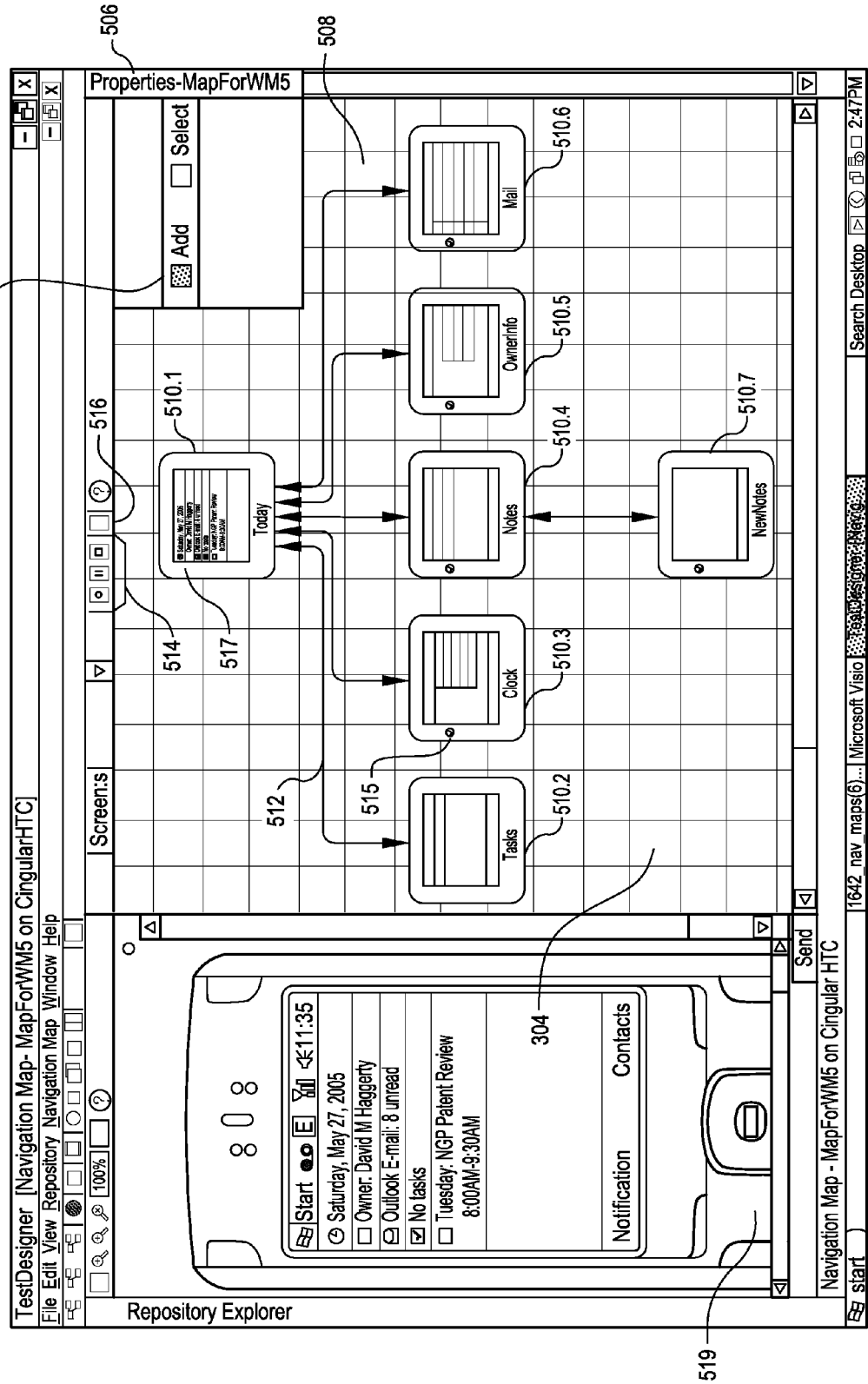
Figure 5C:
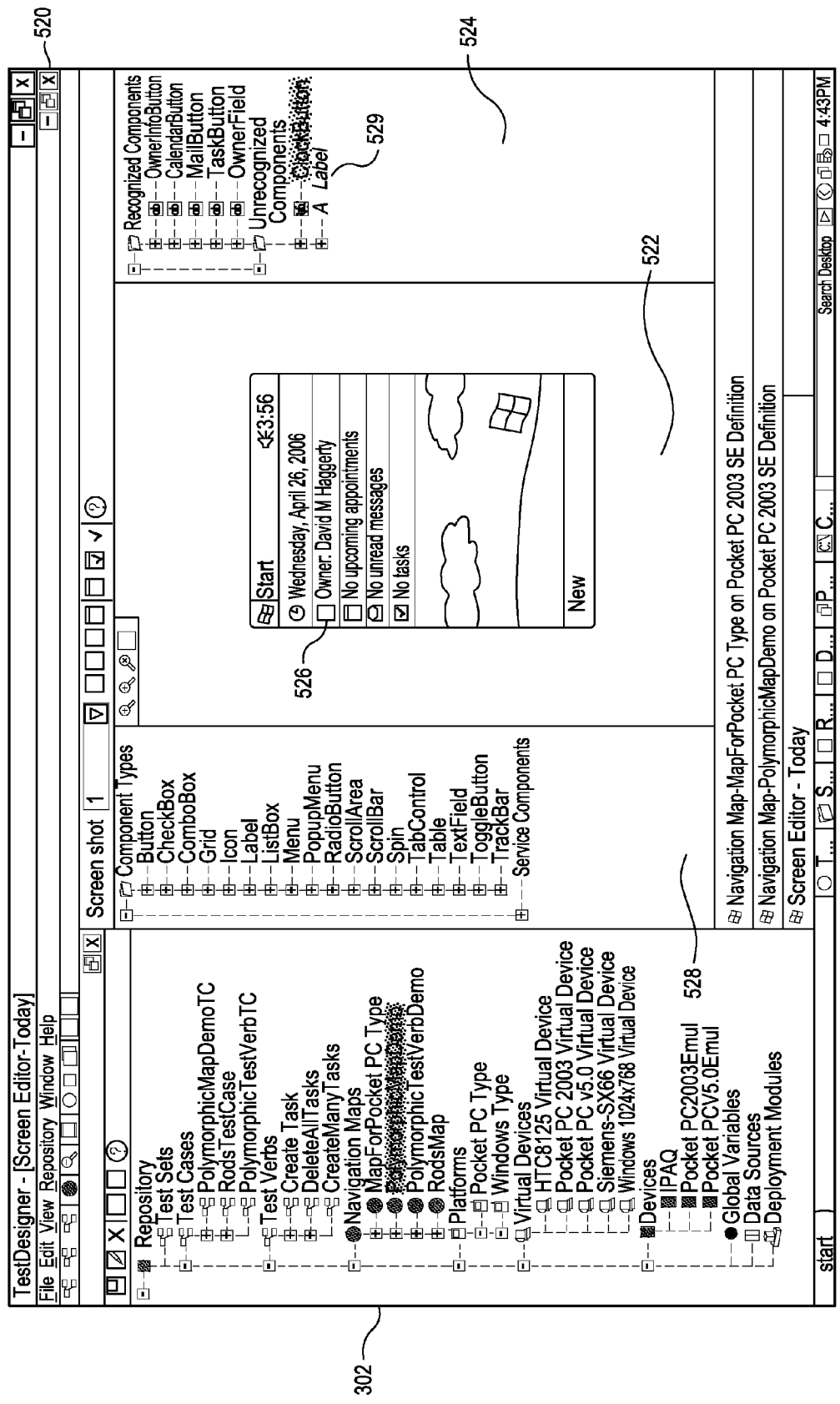

FIGS. 5A-5C illustrate example navigation map panels and screen editor panels of a test development environment according to embodiments of the invention that may be used in the test design process illustrated in FIG. 4.

FIG. 5A illustrates example screen interfaces 502 and 504 for selecting a platform definition and device for a navigation map. In some embodiments, a platform definition is selected in the case that multiple polymorphic versions of the navigation map have been defined. Screen interface 502 provides an example platform definition selection screen. In some embodiments, a list of available platform types is provided in a list. The desired platform definition may be selected and used to provide a platform definition context for the navigation map.

Screen interface 504 provides a device selection interface. Screen 504 provides a list of available devices defined within the repository. Those devices having attributes that match the currently selected platform definition may be highlighted on one manner, while those devices whose attributes do not match the currently selected platform type may be highlighted differently or not highlighted at all. For example, in some embodiments, devices having attributes that match the currently selected platform definition are displayed using green text, while devices that do not match the currently selected platform are displayed using red text.

FIG. 5B illustrates an example main navigation map screen 506 according to embodiments of the invention. In the example shown, a navigation map has been selected from explorer pane 302, and detail pane 304 is updated to display the selected navigation map 508. In the example, the navigation map 508 includes data for navigating between five screens 510.1-510.7. Screen 510.1 comprises a main screen on the DUT, screen 510.2 comprises a tasks screen on the DUT, screen 510.3 comprises a clock screen, screen 510.4 comprises a main notes screen on the DUT, screen 510.5 comprises an owner information screen on the DUT, screen 510.6 comprises a email screen, an screen 510.7 comprises an add notes screen. Each of screens 510.2-510.6 is reachable from the main screen 510.1, and each screen 510.2-510.6 can return to the main screen. However, screen 510.7 is reachable only through main notes screen 510.4. Connecting lines 512 illustrate the navigation between the screens. In some embodiments, arrows indicate the direction in which navigation is permitted. As shown in FIG. 5B, Navigation between screens is not limited to screens that are directly connected. For example, to navigate from screen 510.1 to screen 510.7, the system automatically recognizes that screen 510.6 may be used as an intermediate screen to get from screen 510.1 to 510.7.

Screens may be added and deleted from the navigation map. In some embodiments, recording buttons 514 may be used to add screens to a navigation map. The recording buttons may include a record button, pause button, and stop button. Upon pressing the record button, stimulus originating from a virtual device 519 is sent to the DUT and is recorded. After the DUT has transitioned to new screens, as seen on the virtual device 519, the user may press the add screen button 518. After the add screen button 518 is press the screen is added to the navigation map, displayed on navigation map 506, and may be saved. A connecting line 512 called a screen transition is placed on navigation map 502 connecting the new screens to the originating screen. The connecting line 512 represents the stimulus (transition steps) that caused the screen transition. The user may view or edit the transition step by double-clicking on the line, if for any reason the steps need to be changed.

When not in record mode, selecting a screen 510 from navigation map 502 causes the system to issue the appropriate commands to navigate to the selected screen on the DUT. In addition, the current screen may be highlighted on the navigation map 506 using any mechanism for highlighting known in the art. For example, the screen border may be displayed in a different or brighter color then non-selected screens, or the screen 510 may be made brighter or made to blink etc.

In some embodiments, a screen may be designated as the anchored screen. In this example, the anchored screen is designated by an anchor icon 517. A screen anchor is a set of input steps that will cause the DUT to go to the anchored screen regardless of what screen the DUT is currently on. The system uses screen anchors when/if it cannot recognize the current screen on the DUT. For example, most systems have a mechanism for returning a screen to a home or initial screen, no matter what screen a DUT may currently be displaying. A screen anchor is useful in placing the system in a known initial state when a test case begins. In addition, an anchor screen may be used to place the system at a known screen in the event that the system cannot locate a screen during a screen navigation operation. This capability makes it possible to continue test execution even though a DUT failure has occurred. A visual indication is shown for screens which have screen identifier defined. In the example, screens with identifiers are shown with a green checkmark icon 515.

As can be seen from the above, some embodiments implement a declarative screen model for automated testing. In general, declarative models describe what something is like, rather than how to create it. For example, a declarative model describes the properties of the objects in the model.

FIG. 5C illustrates a screen editor 520 according to embodiments of the invention. Screen editor 520 may be entered upon selecting a screen from navigation map 506 when the test environment is not in record mode. Screen editor 520 includes a component explorer 528, screen bitmap pane 522, and a screen component list 524. Screen bitmap pane 522 displays a bitmap of the currently selected screen.

Component explorer 528 contains a list of templates for each type of component that may be used to define a screen of a DUT, and which may be automatically recognized by the system.

Screen component list 524 displays a list of components defined for the screen. The components may be recognized components or not recognized components. A recognized component is one that the system has successfully detected as being present on the screen bitmap 522. In some embodiments, recognized components are highlighted on the screen bitmap 522. For example, a recognized component such as a button may be surrounded by a highlighted box. In the example shown, owner button 526 is among the components that have been recognized as present in screen bitmap 522. Not recognized components are components that have been defined as possibly being present, but are not currently found on screen bitmap 522. In some embodiments, property panel 524 lists the recognized components and the unrecognized components defined for a particular screen. Components in the list may be designated a screen identifiers through the use of a right-click menu. Components that have been designated as identifiers for the screen are shown by using bolded type for component name 529. A screen identifier is a component or set of components that may be used to uniquely recognize a screen. The system then uses the screen identifiers to determine which screen a DUT is currently on, and may also use the screen identifiers to determine that the system has navigated to the correct screen.

In order to add a component to screen component list 524, a user selects the desired component type from component explorer pane 528. A recognition rule editor is then invoked that allows a user to define how the component will be recognized on a screen. Or, the user may use a component template that is listed under the component type. When a component template is used the component is automatically created, and therefore the recognition rule editor is not invoked.

Figure 5D:
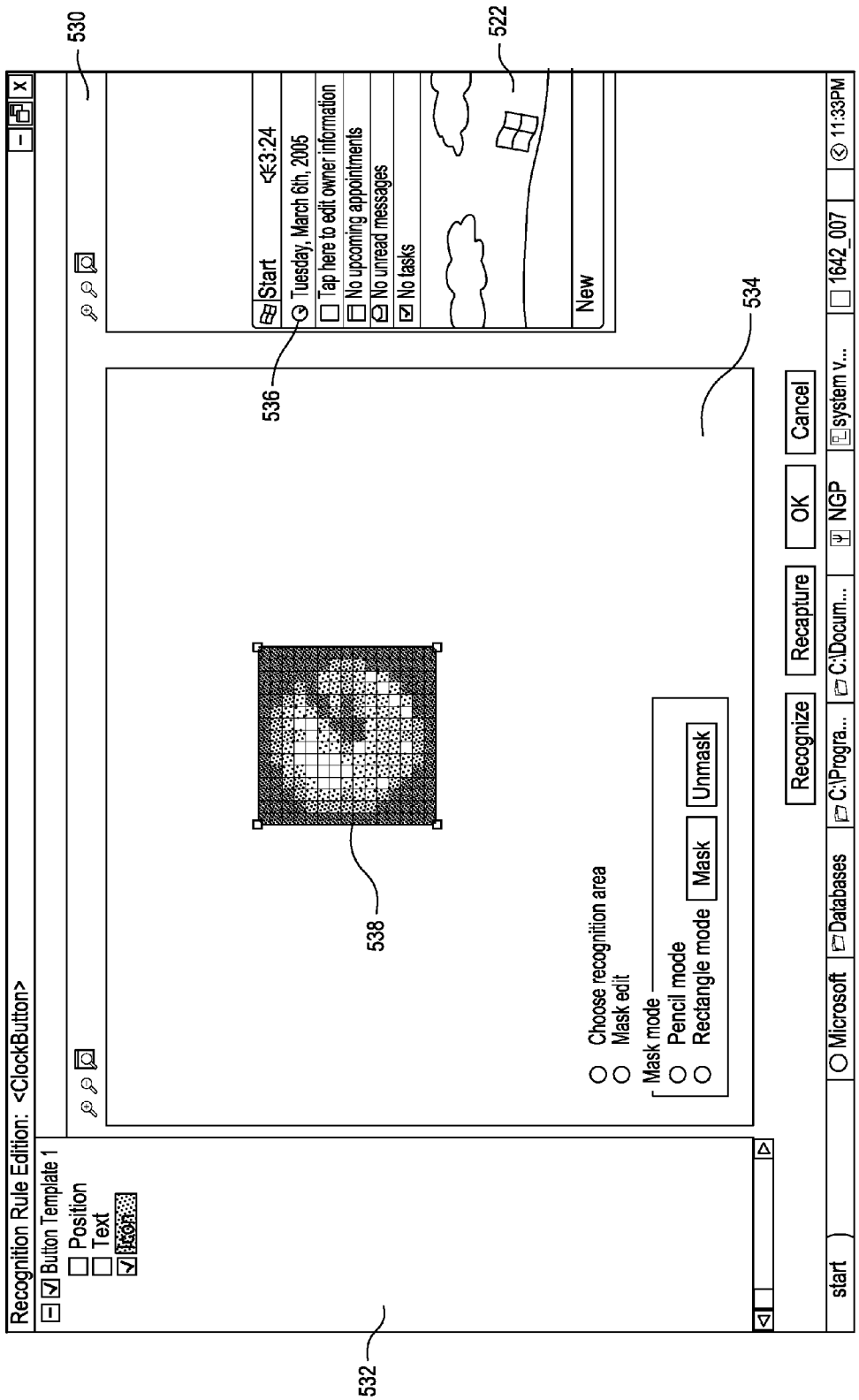
Figure 6:
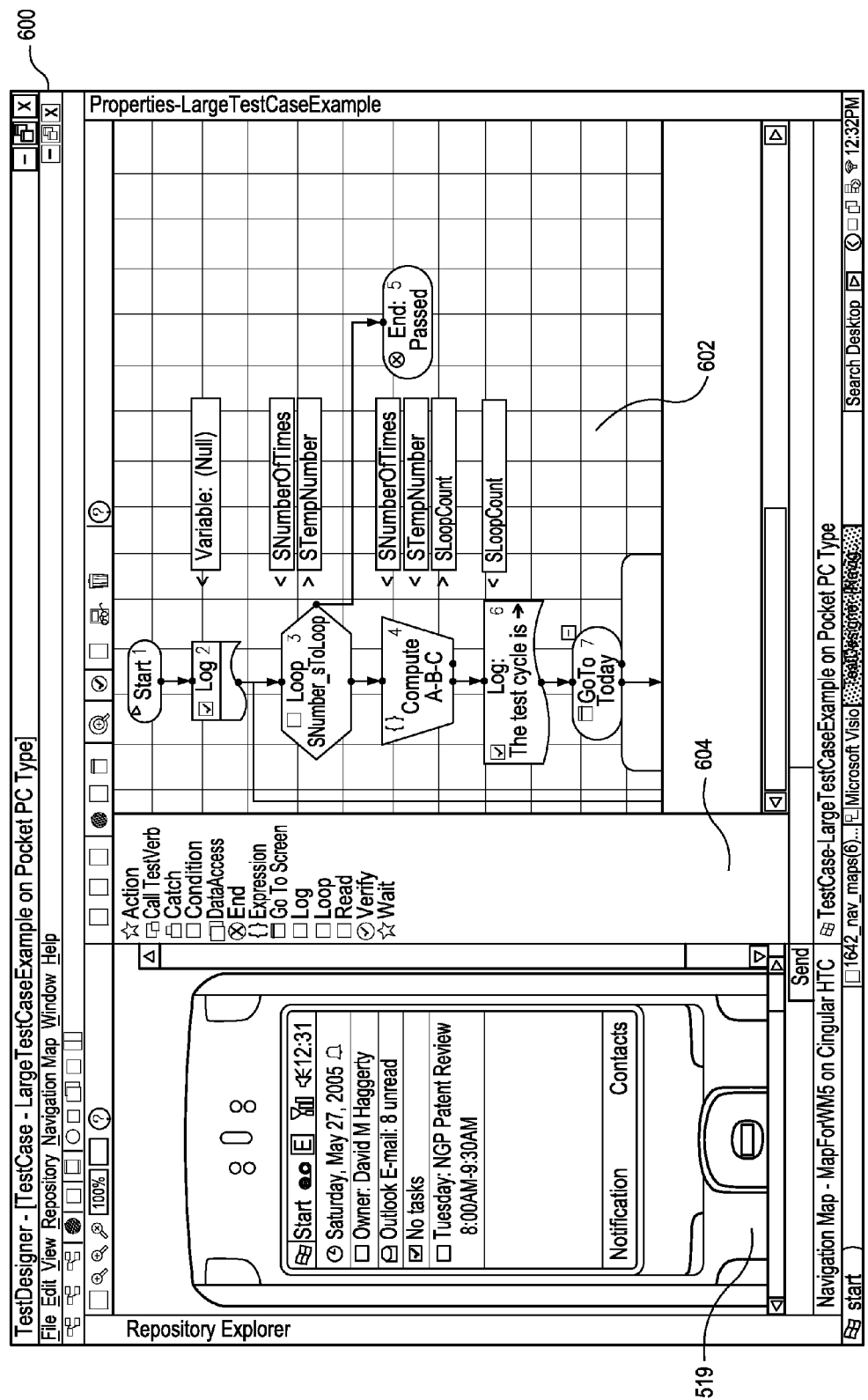
FIG. 6 illustrates an example test case panel of a test development environment according to embodiments of the invention.

FIG. 5D illustrates a recognition rule editor 530 according to embodiments of the invention. In the example shown, a user has indicated that a button is to be recognized. The recognition rule editor 530 includes a current screen bitmap 522, a recognition mode pane 532, and a bitmap 534. Recognition mode 532 controls how the button will be recognized. In some embodiments, recognition may be position based, text based, or icon based. In position based recognition, a particular bit pattern is expected at a particular position on the screen. The position may be defined using four corners, a border search, a line based search, or an absolute position. Additionally, recognized components may be highlighted on the screen. In some embodiments, recognized components are highlighted by placing a colored rectangle around the recognized portion.

In text based recognition, text on a button label may used to recognize the button. The user may select a bitmap for the text, upon which the system may perform optical character recognition in order to determine the actual text contained in the bitmap. The user may then verify the correct text for the button.

In icon based recognition, a bitmap area for the button is selected from screen bitmap 522. In some embodiments, the user may define bits within the bitmap area as being significant to the button recognition, or as "don't care bits" in which the system will ignore the value for purposes of button recognition. For example, a square area may be selected that contains a circular button. Pixels in the four corners of the selected area that are outside of the circular button bitmap may be designated as "don't care" bits because they are not significant in detecting the presence of the button. In addition, bits that may be set as part of a background color may be designated as "don't care" bits in order to allow for the same button to be detected no matter what background a user has selected.

A screen recognition component may be designated as a template component. In this case, a template is defined for recognizing the component. Once defined, the template may be applied to multiple screens where the same button may appear. Thus a user does not have to redefine a recognition rule for each screen a button may appear on. After a component template has been defined it appears under the parent component type in the component explorer list 528.

FIG. 6A illustrates an example test design panel 600 of a test development environment according to embodiments of the invention. In general, the test design panel is used to create, edit, debug, and run test cases and test verbs. The test design panel has three basic modes of operation. They are design, debug, and run modes. The design mode is used to create and edit test cases and verbs through recording on the virtual device 519, or by drag and drop construction using test logic blocks. In the example shown, test panel 600 includes a test case flow chart 602 and a test logic block list 604. Test logic block list 604 provides a list of the differing test symbols and operations that may be used to define a test case or test verb. Each symbol may comprise one or more steps in the test logic. In some embodiments, the list includes test logic blocks to assign values to variables, invoke other test cases, catch exceptions, test conditions or values, invoke custom written code, fill in variables or screen input areas with data from a data source, execute steps in the test case as part of a loop, execute an expression, go to a screen on a platform, log text to a log file, or end the test case. Those of skill in the art will appreciate that other symbols representing test logic may be used and are within the scope of the inventive subject matter To create or edit a test case or test verb, a user selects the desired test symbol from symbol list 604 and drags the symbol to flow chart 602. A new symbol may be connected to a previously existing symbol either based on the relative positions of the symbols, or a user may explicitly drag a connecting line from one symbol to another. Connection points on the symbols define the entry point for a test step and exit points for the test step. In some embodiments, two exit connection points may be provided. One connection point may be used to proceed to the next symbol if the current step successfully exits. A second connection point may be used to proceed to a differing symbol if the current step results in an error condition. In addition to using drag and drop operations to create and edit test cases and test verbs, the virtual device 519 may be used to add or insert test logic blocks into the test logic flow. DUT stimulus commands such as click on button or select menu item may be recorded into the test case or verb. When in design-record mode, components defined on the current screen are outlined to give the user feedback as to the presence of the screen component. The use then can use a right-click menu to record stimulus, read, or verify commands associated with the highlighted component. After command selection the DUT is stimulated, if the command is a stimulation command, and the corresponding test logic block is inserted into the test case or test verb. In addition to recording commands associated with screen components, GoTo Screen and GoTo Platform commands may be recorded as well. When a GoTo screen command is selected/recorded the system automatically navigates to the selected screen on the DUT by using the associated navigation map. The corresponding test logic block is inserted into the test case or test verb. When a GoTo Platform command is selected the system automatically switches the DUT context to the DUT associated with the selected platform. Bubbles or clouds are used as background to show the test logic commands that are within the context of GoTo Screen and GoTo Platform commands. Within a GoTo Screen context bubble all the test logic blocks contained within are related to, or are in the context of, the selected screen. Within a GoTo Platform context bubble all the test logic blocks contained within are related to, or are in the context of, the selected screen, including GoTo Screen blocks.

In some embodiments, icons within the symbols in test case flow chart 602 indicate the type of symbol (loop, assignment etc.) and may also be selected to set break points at the symbol to be used for debugging purposes.

Further, in some embodiments, a variable window 606 may be displayed and used to examine the values of variables at various points in the execution of a test case.

Multiple Device Environments

As discussed above, a system may include multiple target services 160, each of which may manage multiple devices under test 140. It should be noted that the number of devices under test 140 can grow quit large. In addition, many various types and versions of devices under test may be coupled to the system via target services 160, and that many different software environments may exist on the devices under test. As a result, the number of platform types, and platform groups, and platform definitions may be quite large and vary from system to system.

Additionally, an automated test procedure may need to deal with more than one device under test during the design, debugging, and execution of the automated test procedure.

Thus in some embodiments, the system manages both pools of similar devices under test and groups of disparate devices under test. In some embodiments, platform definitions, platform types, and platform roles as described above may be used to determine which of the many devices under test that may be available within a system should be selected when designing, debugging, or executing an automated test procedure.

In some embodiments, a system selects a device under test based on whether the candidate device is available and whether the candidate device attributes match the parameters defined by the platform definition, the platform group, the platform type, and/or any platform roles utilized by an automated test procedure.

A further aspect of a multi-device system of some embodiments includes polymorphism for various aspects of the system. In general, polymorphism refers to ability to process objects differently depending on their platform type, platform group, platform definition, or role. In some embodiments, the system provides polymorphic navigation maps and polymorphic test verbs. However, the embodiments are not limited to applying polymorphic operation to any particular element of the system, and in alternative embodiments, polymorphism may be applied to other elements. For example, some embodiments may provide polymorphic component templates.

A polymorphic navigation map comprises a navigation map that may be reused across all of the platforms within a platform group. In general a polymorphic navigation map provides an abstraction of the presentation layer for the platforms within a group. Thus the navigation map may remain constant (and be reused) for platforms within a platform group because the underlying behavior of the operating systems and applications within a platform group does not change across devices in a platform group.

A polymorphic test verb comprises a test verb that may be reused across platform types. In general a polymorphic test verb provides an abstraction of the behavior of devices. For example, two devices may implement task list in very different ways, using different device behaviors to add tasks to the task list. However, a single polymorphic test verb labeled "CreateTask" may be called from an automated test procedure. The interface to the test verb may remain constant, however different version of the test verb may be implemented for various platform types. The particular instance of the test verb called may vary depending on the platform type for a current device under test. The automated test procedure need only call the polymorphic test verb, the system determines the particular instance of the test verb depending on the platform context. Thus it may not be necessary to alter the test logic of an automated test procedure when a new platform type is added, a designer may only need to supply an instance of the polymorphic test verb for the new platform type.

A further aspect of various embodiments includes managing test sessions in which multiple test cases may need to access multiple devices. This can occur because a single test case may access more than one device under test, or different test cases may access different devices under test. In some embodiments, the test cases may specify a platform role. During a test session, the platform role may be associated with particular platform type, platform group, and/or platform definition. The system aggregates all of the roles within the potentially many test cases within a test session, and determines how many unique roles exist for the test session. Thus within a test session, each test case that refers to the same platform role will access the same device under test. This is desirable, because it allows a test designer to avoid having to specify particular devices under test for each of what may be many test cases.

Methods

In various embodiments, methods for managing multiple test sessions and multiple test environments are provided. In one embodiment, a method for managing multiple devices includes receiving a request from an automated test environment to access one of several devices under test that may be managed by one or more target services.

A system executing the method then determines if a set of one or more attributes describing a candidate DUT from the set of managed DUTs matches a set of one or more match parameters specified by a test element in the automated test procedure.

If the candidate device's attributes are a match to the match parameters, then the candidate device is selected for use by the automated test procedure.

The match parameter may include a device identifier, a platform type, a platform group, a platform definition, a platform role or a language (English, French, etc.). The inventive subject matter is not limited to any particular set of match parameters.

In a further embodiment, a method for managing multiple devices may include determining if a DUT from a pool of shared devices is available. For example, a target service or multiple target services may manage multiple DUTs of the same type.

Upon receiving a request to access one of the DUTS, a service may determine if the DUT is available. A DUT may be considered available if it is not currently in use by another automated test procedure or test session.

If the DUT is available, the target service may provide access to the candidate device. Otherwise, the system may select another candidate DUT to determine if it available. If a DUT is selected, it is marked as unavailable so that other automated test procedures are prevented from accessing the selected DUT until the current automated test procedure is finished with the selected DUT.

In further embodiments, a method provided within the test environment may alert a user if a given platform type, platform group or platform definition is referenced in an automated test procedure and no devices are currently being managed exist that match the given platform type, group or definition. In some embodiments, an alert may be presented to the user. In alternative embodiments, a report may be generated listing the platform types, groups or definitions that are referenced in automated test procedures, but are not currently managed by the system.

The systems and methods described above can include hardware, firmware, and/or software for performing the operations described herein. Furthermore, any of the components can include machine-readable media including instructions for causing a machine to perform the operations described herein. Machine-readable media includes any mechanism that provides (i.e., stores and/or transmits) information in a form readable by a machine (e.g. a computer). For example, tangible machine-readable media includes read only memory (ROM), random access memory (RAM), magnetic disk storage media, optical storage media, flash memory machines, etc. Machine-readable media also includes any media suitable for transmitting software over a network.

The illustrations of embodiments described herein are intended to provide a general understanding of the structure of various embodiments, and they are not intended to serve as a complete description of all the elements and features of apparatus and systems that might make use of the structures described herein. The accompanying drawings that form a part hereof show by way of illustration, and not of limitation, specific embodiments in which the subject matter may be practiced.

Applications that may include the apparatus and systems of various embodiments broadly include a variety of electronic and computer systems. The elements, materials, geometries, dimensions, and sequence of operations can all be varied to suit particular packaging requirements.

Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that any embodiment have more features than are expressly recited in a claim. Thus the following claims are hereby incorporated into the Detailed Description, with each claim standing on its own as a separate embodiment.

What is claimed is:

1. A method comprising:
    receiving a request from an automated test environment to access one of a plurality of devices under test, each of said devices incorporating processing logic;
    determining if a set of one or more attributes describing a candidate device under test of the plurality of devices under test matches a set of one or more match parameters; and
    providing access to the candidate device under test for testing operation of software utilizing the processing logic of the candidate device under test if a match to the set of one or more match parameters is determined.

2. The method of claim 1, wherein the match parameters include a device identifier.

3. The method of claim 1, wherein the match parameters include parameters describing a platform type.

4. The method of claim 1, wherein the match parameters include parameters describing a platform group.

5. The method of claim 1, wherein the match parameters include parameters describing a platform definition.

6. The method of claim 1, wherein the match parameters include parameters describing a platform role.

7. A method comprising:
    providing a service operable to manage a plurality of devices under test, wherein at least a subset of the devices under test share a common set of attributes;
    receiving a request to access one of the subset of the devices under test;
    determining the availability of a first candidate device under test in the subset of the devices under test;
    providing access to the first candidate device under test if the first candidate device is available; and
    determining the availability of a second candidate device under test of the first candidate device is not available.

8. The method of claim 7, wherein determining availability include determining whether a candidate device under test is currently allocated to a test environment.

9. The method of claim 7, wherein determining the availability of the first candidate comprises determining whether the first candidate is currently in use by a test procedure or test session.

10. The method of claim 7, wherein providing access to the first candidate device under test includes executing a test set on the first candidate under test, the test set including one or more automated test cases and test case logic to control execution or invocation of said one or more automated test cases, each of said one or more automated test cases comprising test case logic and test case data.

11. The method of claim 10, wherein the first candidate device under test and the second candidate device under test are from the group consisting of personal computers, laptop computers, personal data assistants, cellular phones, medical devices, washing machines, wristwatches, pagers, and automobile information displays.

12. At least one computer readable medium having collectively stored thereon instructions for executing the method of claim 7.

13. A method comprising:
    determining a set of one or more device types used by an automated test procedure;
    determining a set of zero or more unavailable device types of the set of one or more device types that are not part of a set of one or more, devices under test communicably coupled to a test environment; and
    reporting the set of zero or more unavailable device types.

14. The method of claim 13, wherein reporting includes displaying a list of the set of zero or more unavailable devices.

15. The method of claim 13, where reporting includes printing a list of the set of zero or more unavailable devices.

16. The method of claim 13, wherein the one or more device types are from the group consisting of personal computers, laptop computers, personal data assistants, cellular phones, medical devices, washing machines, wristwatches, pagers, automobile information displays, handheld computers, mobile computing devices, server computers, mainframe computers, and workstation computers.

17. The method of claim 13, wherein the automated test procedure includes executing a test set on at least one of said devices under test, the test set including one or more automated test cases and test case logic to control execution or invocation of said one or more automated test cases, each of said one or more automated test cases comprising test case logic and test case data.

18. The method of claim 17, wherein the test environment includes a computer system executing one or more software applications providing a user interface for managing automated test cases.

19. At least one computer readable medium having collectively stored thereon instructions for executing the method of claim 13.

* * * * *